No. 883,371. PATENTED MAR. 31, 1908.
G. H. YOUNG.
VEHICLE STEERING DEVICE.
APPLICATION FILED MAY 21, 1907.

2 SHEETS—SHEET 1.

Witnesses
R. H. Decker.
F. C. Dahlberg.

Inventor.
George H. Young.
By Irving & Lane Attorneys.

No. 883,371. PATENTED MAR. 31, 1908.
G. H. YOUNG.
VEHICLE STEERING DEVICE.
APPLICATION FILED MAY 21, 1907.

2 SHEETS—SHEET 2.

Witnesses.
R. H. Decker.
F. C. Dahlberg.

Inventor.
By George H. Young.
Orwig & Lane Attorneys.

UNITED STATES PATENT OFFICE.

GEORGE H. YOUNG, OF DES MOINES, IOWA.

VEHICLE STEERING DEVICE.

No. 883,371.  Specification of Letters Patent.  Patented March 31, 1908.

Application filed May 21, 1907. Serial No. 374,929.

*To all whom it may concern:*

Be it known that I, GEORGE H. YOUNG, a citizen of the United States, residing at Des Moines, in the county of Polk and State of Iowa, have invented a certain new and useful Vehicle Steering Device, of which the following is a specification.

The object of my invention is to provide a device of the character set forth, of simple, durable and inexpensive construction, in which both the front and rear wheels are steered at the same time, to thereby provide for turning sharp corners, and for causing the rear wheels to track with the front wheels.

A further object is to provide a steering device in which the vibration usually imparted from the steering wheels to the steering handle, is reduced to a minimum.

My invention consists in the construction, arrangement and combination of the various parts of the device, whereby the objects contemplated are attained, as hereinafter more fully set forth, pointed out in my claims, and illustrated in the accompanying drawings, in which—

Figure 1:
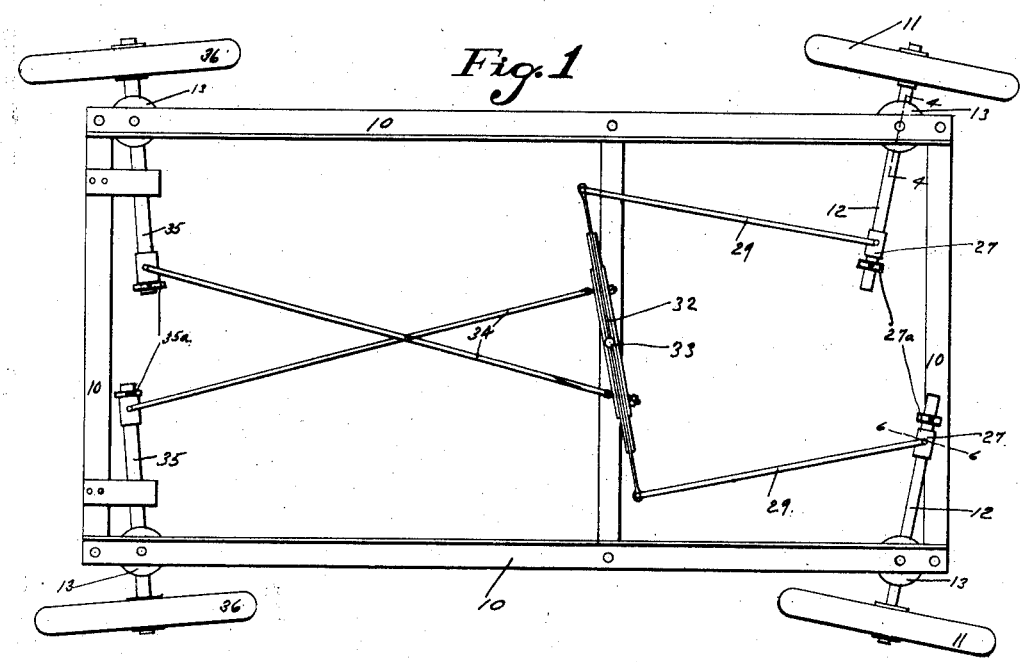
Figure 2:
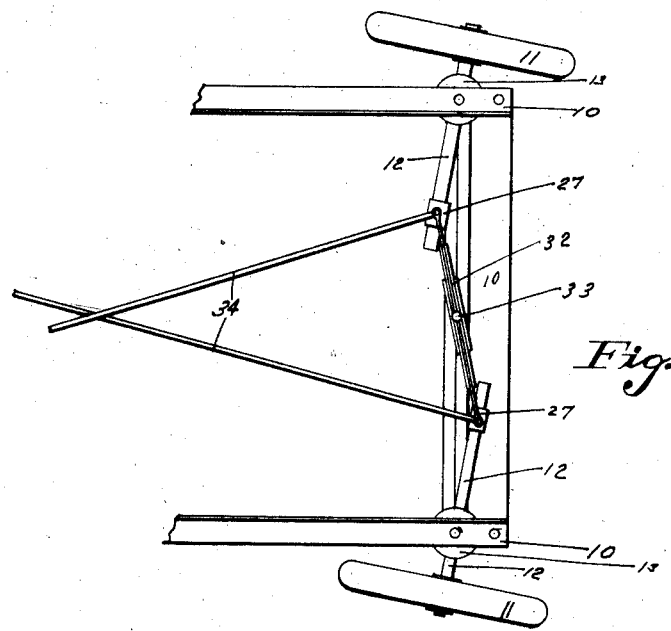
Figure 3:
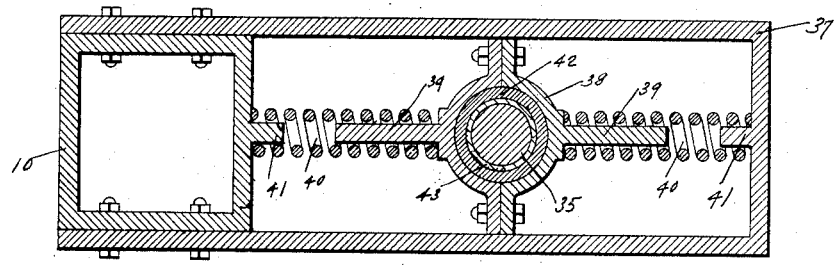
Figure 5:
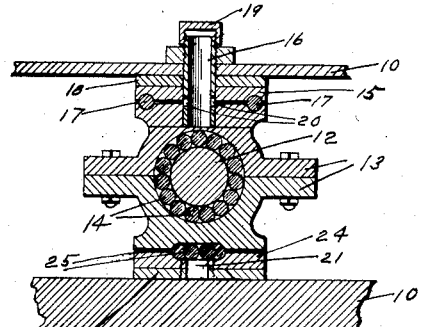
Figure 4:
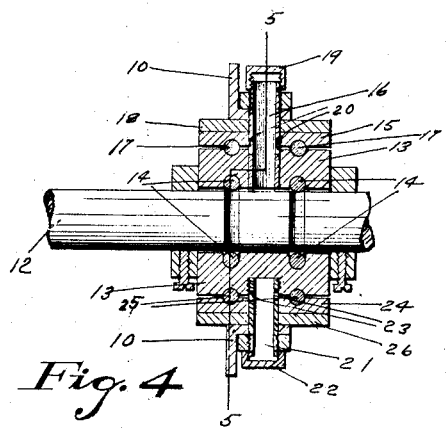
Figure 7:
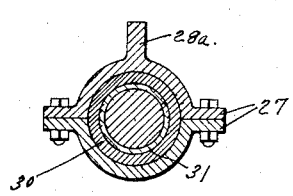
Figure 6:
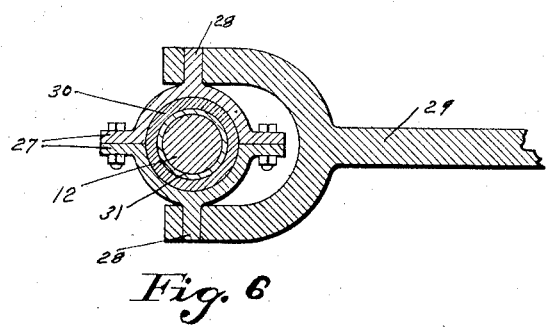

Figure 1 shows a top or plan view of an automobile frame, and a steering device embodying my invention applied thereto. Fig. 2 shows a similar view of the forward end of an automobile frame, with a modified form of my improved steering device applied thereto. Fig. 3 shows an enlarged detail sectional view illustrating certain details of the structure shown in Fig. 1. Fig. 4 shows an enlarged detail sectional view on the line 4—4 of Fig. 1. Fig. 5 shows a sectional view on the line 5—5 of Fig. 4. Fig. 6 shows an enlarged detail sectional view on the line 6—6 of Fig. 1, and Fig. 7 shows a similar view illustrating a modification.

Referring to the accompanying drawings, I have used the reference numeral 10 to indicate the frame of the vehicle, and 11 the front wheels thereof. Each of the front wheels is rotatably mounted upon a short axle 12, which axle is mounted in a bearing device at the forward portion of the frame, which bearing device is illustrated in Figs. 4 and 5, and comprises a hub 13, designed to receive the axle 12, and provided with wo bearing ball race-ways having the bearing balls 14 therein, so that the axle may turn freely within the hub. On top of the hub 13 is a circular plate 15, which plate surrounds a tubular support 16, which support is firmly fixed in the hub 13, and extends upwardly above it through the plate 15. This plate 15 and the top of the hub are provided with a horizontally arranged bearing ball race-way, in which the bearing balls 17 are mounted, so that the hub may freely rotate in a horizontal plane relative to the plate 15.

Above the plate 15 is a cushion 18, made of rubber, or other yielding material, which cushion is interposed between the plate 15 and the frame 10. The tube 16 is provided at its top with a screw threaded cap 19, and is also provided with perforations 20, by which lubricating material within the tube may be admitted to the bearing balls 17. The bottom of said tube is also open so that lubricating material may be admitted to the axle 12, between the rows of bearing balls 14. Screwed into the bottom of the hub 13 is a tube 21, having a screw cap 22 at its lower end, and having openings 23 in line with the bottom of the hub 13. Below the hub 13 is a bearing plate 24, having therein a bearing ball race-way to receive the bearing balls 25. Below the plate 24 is a cushion 26, interposed between the plate 25 and the lower frame member 10. The tubes 16 and 21 project through the frame members 10, and thus serve as a means for securing and pivoting the bearing device within the frame 10. On the inner end of each of the axles 12 is a collar 27, preferably made of two parts bolted together, each having a trunnion 28 thereon, which trunnions are engaged by the forked arms 29. Within the collar 27 is a cylindrical cushion 30, and inside of the cushion is a cylindrical bearing device 31, and the axle is free to move longitudinally or to rotate within the bearing 31. Pivotally supported near the central portion of the vehicle frame is a spring bar 32, having the arms 29 attached to its opposite ends, and having at its central portion a steering shaft 33 to which the spring is fixed. Attached to the spring bar 32 at points mid-way between its central portion and outer ends, are the steering rods 34, for the rear wheels. These rods are crossed as shown in Fig. 1, and connected with the rear axles 35 by means of bearing devices of the kind shown in Fig. 6, which bearing devices are prevented from moving longitudinally over the ends of the rear axles 35 by means of the collars 35ª, fixed to the axle. The collars 27 that are attached to the front axles are also held against such movement by means of collars 27ª, fixed to the front axles 12. On each of the rear axles is a wheel 36, the axles being supported in bearing devices of the kind illustrated in Fig. 4, and also extended through guiding devices of the kind shown in Fig. 3. Each of these guide devices comprise an oblong frame 37, fixed to the frame 10. Contained within the frame 37 is a boxing 38 preferably made of two parts bolted together, and having lugs 39 at opposite sides. Mounted on these lugs are two extensible coil springs 40, the outer ends of which engage lugs 41, to thereby hold the springs in line. By this arrangement, the boxing 38 is permitted to yield against the pressure of the springs, either forwardly or rearwardly, and the boxing is also permitted a slight swinging movement in a horizontal plane, as required to permit the axles to move forwardly and rearwardly enough to give the wheels the proper direction for steering. Mounted within the boxing 38 is a cylindrical cushion 42, and within the cushion 42 is a bearing 43, to receive the shaft 35. By means of this construction, the cushion 42 takes up a material part of the vibration of the rear axle, and the springs 40 also aid in cushioning such vibration. Furthermore, the springs 40 tend to normally hold the axles 35 at right angles to the frame 37.

In practical use, it is obvious that if the vehicle is traveling in a straight line, the vibration imparted to each wheel would be cushioned as applied to the steering shaft 13, thereby reducing the vibration of the steering wheel to a minimum. Assuming that it is desired to turn the steering wheels in a direction as shown in Fig. 1, then the operator manipulates the steering shaft to turn the spring bar 32 in the direction shown in Fig. 1. This will move all of the wheels to the position shown, and the vehicle will be steered toward the right, and the front and rear wheels will run in substantially the same track. If any of the wheels should strike an obstruction, the axle would be permitted to slide a short distance in the bearing that connects it with the steering rod, so that the vehicle would not be thrown out of its path.

In the modified form shown in Fig. 2, I have shown the steering wheel shaft 33 arranged at the front of the vehicle frame, and the spring bar 32 connected direct to the collars 27, and the rods 34 for steering the rear wheels are connected direct to the ends of the spring bar 32. The operation of the device when thus connected is substantially the same as when arranged in the manner shown in Fig. 1, except that the collars 27 are permitted a slight longitudinal movement on the axles 12.

In the modified form shown in Fig. 7, I have shown the collar 27 provided with only one lug 28ª, instead of two lugs 28, as shown in Fig. 6. When this construction is used, a single arm 28 is connected with the lug 28ª.

Having thus described my invention, what I claim and desire to secure by Letters Patent of the United States, therefor, is—

1. In a device of the class described, the combination of a vehicle frame, four axles pivotally supported therein, a spring bar pivotally connected with the frame, a collar mounted on the inner end of each axle, arms connecting the ends of the spring bar with the collars on the forward axles, and crossed arms for connecting the spring bar with the collars on the rear axles.

2. In a device of the class described, the combination of a vehicle frame, four axles pivotally supported therein, a spring bar pivotally connected with the frame, a collar mounted on the inner end of each axle, arms connecting the ends of the spring bar with the collars on the forward axles, and crossed arms for connecting the spring bar with the collars on the rear axles, and a cushioning cylinder in each collar.

3. In a device of the class described, the combination of an axle, a collar surrounding the axle, a cylindrical cushion within the collar, and a cylindrical bearing within the cushion, said bearing being in engagement with the axle.

4. In a device of the class described, the combination of an axle, a collar surrounding the axle, a cylindrical cushion within the collar, and a cylindrical bearing within the cushion, said bearing being in engagement with the axle, lugs formed on the collar, and forked arms pivotally connected with said lugs.

5. In a device of the class described, the combination of an axle, a hub mounted upon the axle, plates above and below the hub, and rotatably connected therewith, cushions above the upper plate and below the lower plate, and means for connecting said hub with a vehicle frame.

6. In a device of the class described, the combination of an axle, a hub having bearing balls therein to engage the axle, a tube extended through the hub, from the axle upwardly, a tube seated in the lower portion of the hub, and extended downwardly, screw caps for said tubes, the upper tube having openings therein near its central portion, and having its lower end open for supplying lubricating material to the axle, and the lower tube having openings near its central portion, a plate above and a plate below the axle, each provided with horizontally arranged bearing ball grooves, a set of bearing balls for each plate, a cushion above the upper plate, and a cushion below the lower plate, and a vehicle frame having said tubes passed through it to pivotally support the axle on the frame.

7. In a device of the class described, the combination of a vehicle frame, an oblong guide frame connected therewith, a rear axle passed through the guide frame, a collar within the guide frame having lugs at its sides, extensible coil springs mounted on said lugs, and having their outer ends in engagement with the ends of the guide frame, a cushion within the collar, and a bearing within the cushion, mounted upon the axle.

Des Moines, Iowa, May 8, 1907.

GEORGE H. YOUNG.

Witnesses:
RALPH ORWIG,
SIDNEY F. CHRISTY.